(12) United States Patent
Houck et al.

(10) Patent No.: US 9,238,558 B2
(45) Date of Patent: Jan. 19, 2016

(54) RECIPROCATING PLACER SYSTEM

(71) Applicant: Graphic Packaging International, Inc., Atlanta, GA (US)

(72) Inventors: Jeremy Houck, Deerwood, MN (US); Kelly Ziegler, Crosby, MN (US)

(73) Assignee: Graphic Packaging International, Inc., Atlanta, GA (US)

( * ) Notice: Subject to any disclaimer, the term of this patent is extended or adjusted under 35 U.S.C. 154(b) by 97 days.

(21) Appl. No.: 14/022,847

(22) Filed: Sep. 10, 2013

(65) Prior Publication Data

US 2014/0069328 A1    Mar. 13, 2014

Related U.S. Application Data

(60) Provisional application No. 61/743,882, filed on Sep. 12, 2012.

(51) Int. Cl.
| | |
|---|---|
| *B65B 61/20* | (2006.01) |
| *B65G 59/00* | (2006.01) |
| *B65H 3/08* | (2006.01) |
| *B65H 3/44* | (2006.01) |

(52) U.S. Cl.
CPC .............. *B65G 59/00* (2013.01); *B65H 3/0816* (2013.01); *B65H 3/44* (2013.01); *B65H 2701/1764* (2013.01)

(58) Field of Classification Search
CPC ..................................................... B65B 43/185
USPC ................. 198/471.1; 221/110, 124, 131, 92; 271/107, 158, 159, 9.01, 9.02, 9.04, 271/9.06, 9.08, 9.12, 9.13, 90, 91, 94; 414/276, 278, 280, 281, 282, 283, 626, 414/627, 728, 736, 737, 795.8, 796.4, 414/796.5, 797, 797.4, 797.7, 797.8; 493/315

See application file for complete search history.

(56) References Cited

U.S. PATENT DOCUMENTS

| | | | | |
|---|---|---|---|---|
| 2,235,377 | A * | 3/1941 | Laxo | 72/161 |
| 2,704,593 | A * | 3/1955 | Galloway | 198/418.3 |
| 2,805,060 | A * | 9/1957 | Lefief | 271/11 |
| 3,750,804 | A * | 8/1973 | Lemelson | 414/276 |
| 3,884,278 | A * | 5/1975 | Nakashima | 141/67 |
| 4,042,126 | A | 8/1977 | Blauvelt et al. | |
| 4,643,633 | A | 2/1987 | Lashyro | |

(Continued)

FOREIGN PATENT DOCUMENTS

| | | |
|---|---|---|
| DE | 40 29 520 A1 | 3/1992 |
| DE | 44 39 723 A1 | 5/1996 |

*Primary Examiner* — Gregory Adams
(74) *Attorney, Agent, or Firm* — Womble Carlyle Sandridge & Rice, LLP

(57) ABSTRACT

A reciprocating placer system for selectively picking and placing articles includes a picking assembly that is moveable between one or more magazines in which the articles are each received and stored in a stacked configuration. The picking assembly can include a series of vacuum cups for engaging and selectively picking articles from one or more magazines and thereafter depositing the selected articles on a conveyor or within a receptacle. A drive system controls the transverse movement of the picking assembly with respect to the one or more magazines in order to control the movement of the picking assembly between the one or more magazines and for adjusting the position of the picking assembly, with a selected article engaged thereby, with respect to the conveyor or receptacle on which the article is to be deposited.

27 Claims, 12 Drawing Sheets

(56) References Cited

U.S. PATENT DOCUMENTS

| | | | |
|---|---|---|---|
| 4,759,679 A * | 7/1988 | Muller | 414/416.01 |
| 4,881,934 A | 11/1989 | Harston et al. | |
| 5,019,207 A | 5/1991 | McCoy | |
| 5,171,007 A | 12/1992 | Kasprzak et al. | |
| 5,193,967 A * | 3/1993 | Sartorio | 414/797 |
| 5,456,570 A | 10/1995 | Davis et al. | |
| 5,692,361 A | 12/1997 | Ziegler et al. | |
| 5,700,128 A * | 12/1997 | Tonnigs et al. | 414/789.1 |
| 5,704,758 A | 1/1998 | Davis et al. | |
| 5,711,137 A | 1/1998 | Moncrief et al. | |
| 5,809,738 A | 9/1998 | Stephens et al. | |
| 5,813,826 A * | 9/1998 | Martin et al. | 414/797 |
| 5,997,458 A | 12/1999 | Guttinger et al. | |
| 6,058,679 A | 5/2000 | Ziegler et al. | |
| 6,273,242 B1 | 8/2001 | Olson et al. | |
| 6,276,893 B1 * | 8/2001 | Pluschow et al. | 414/797.8 |
| 6,964,228 B2 * | 11/2005 | Koizumi et al. | 101/477 |
| 6,993,887 B2 * | 2/2006 | Dharssi et al. | 53/445 |
| 7,137,530 B2 | 11/2006 | Chirnomas | |
| 7,273,343 B2 | 9/2007 | Ziegler | |
| 7,390,040 B2 * | 6/2008 | Subotincic | 294/65 |
| 7,603,835 B2 | 10/2009 | Caporale | |
| 7,658,054 B2 * | 2/2010 | Veix | 53/458 |
| 7,695,421 B2 | 4/2010 | Ford | |
| 8,550,294 B2 | 10/2013 | Martin | |
| 2003/0017035 A1 * | 1/2003 | Solomon et al. | 414/416.07 |
| 2003/0207744 A1 * | 11/2003 | Bretl | 493/375 |
| 2007/0125845 A1 * | 6/2007 | Martin et al. | 235/381 |
| 2007/0257416 A1 * | 11/2007 | Ford | 271/91 |
| 2009/0087296 A1 | 4/2009 | May et al. | |
| 2011/0071666 A1 * | 3/2011 | Martin et al. | 700/231 |
| 2013/0064636 A1 | 3/2013 | Karst | |

* cited by examiner

RECIPROCATING PLACER SYSTEM

CROSS REFERENCE TO RELATED APPLICATIONS

The present Patent Application is a formalization of previously filed, U.S. Provisional Patent Application Ser. No. 61/743,882, filed Sep. 12, 2012 by the inventors named in the present Application. This Patent Application claims the benefit of the filing date of this cited Provisional Patent Application according to the statutes and rules governing provisional patent applications, particularly 35 U.S.C. §119(a)(i) and 37 C.F.R. §1.78(a)(4) and (a)(5). The specification and drawings of the Provisional Patent Application referenced above are specifically incorporated herein by reference as if set forth in their entirety.

FIELD OF THE INVENTION

The present invention generally relates to systems for the pick up, transfer and placement of articles from a magazine or stack. In particular, the present invention relates to a reciprocating multi-lane placer system for selectively picking articles from one or more magazines and placing such articles at a desired location such as on a conveyor or in a receptacle.

BACKGROUND OF THE INVENTION

Automated apparatus and systems for picking articles such as trays, carton blanks, carton sleeves and/or other, similar articles having various shapes and dimensions and placing such articles on a conveyor or a receptacle have been used in the packaging industry for some time. For example, rotary carton feeders have been used for picking or removing substantially flat stock materials such as carton blanks or sleeves from a stack of cartons contained within a magazine, and thereafter transferring the cartons into flights of a product conveyor where the cartons can be loaded with products. Reciprocating placers typically are utilized for picking and placing flat as well as substantially three-dimensional articles such as plastic trays, boxes or other, similar articles that can have a depth as well as a length and width, and placing such articles onto a product conveyor or in a receptacle. In the past, such placers generally have been used for removing articles from a single magazine, thus often requiring frequent restacking of the magazine and/or change out of the stacks of articles held by the magazine to feed different articles as needed, and further typically are operated at a slower rate for picking and removal of three-dimensional articles than rotary carton feeders or placers.

The accompanying drawings, which are included to provide a further understanding of the present disclosure, are incorporated in and constitute a part of the following specification, illustrating various aspects, advantages and benefits of the present disclosure, and together with the detailed description, serve to explain the principles of the present disclosure. In addition, those skilled in the art will understand that, according to common practice, the various features of the drawings discussed below are not necessarily drawn to scale, and that dimensions of various features and elements of drawings may be expanded or reduced to more clearly illustrate the embodiments of the present invention as described in the following disclosure.

Figure 1A:
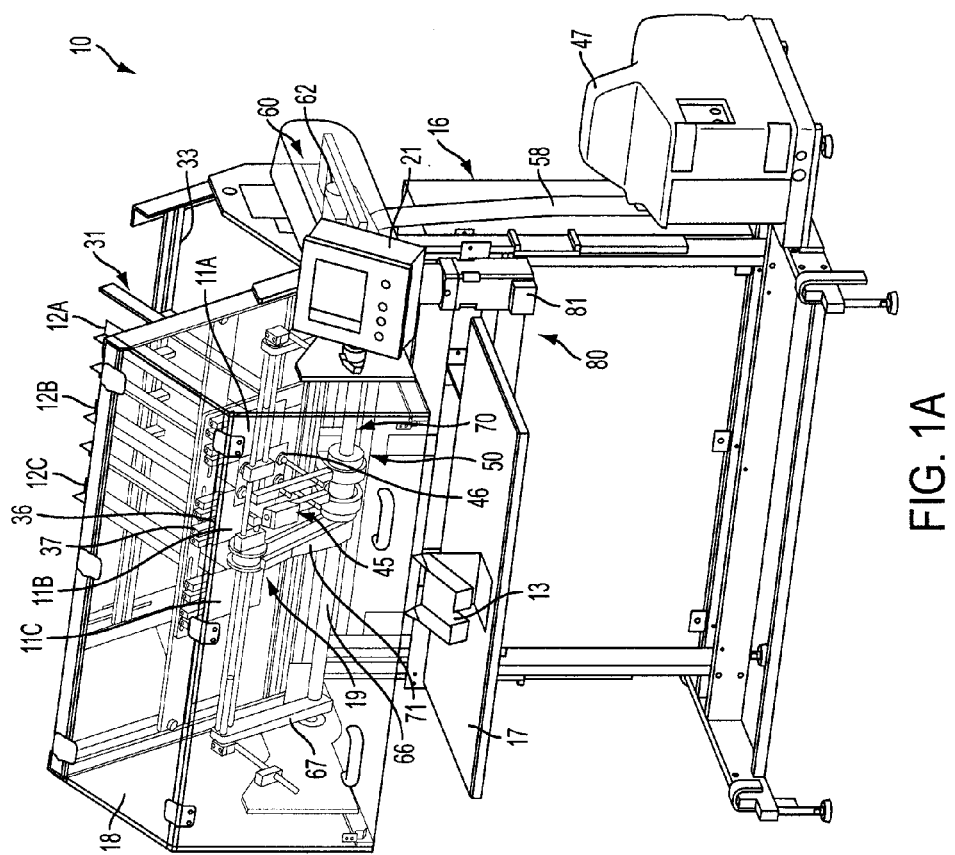
FIGS. 1A-1B are perspective illustrations of one example embodiment of a multi-lane reciprocating placer system according to the principles of the present invention.
Figure 1B:
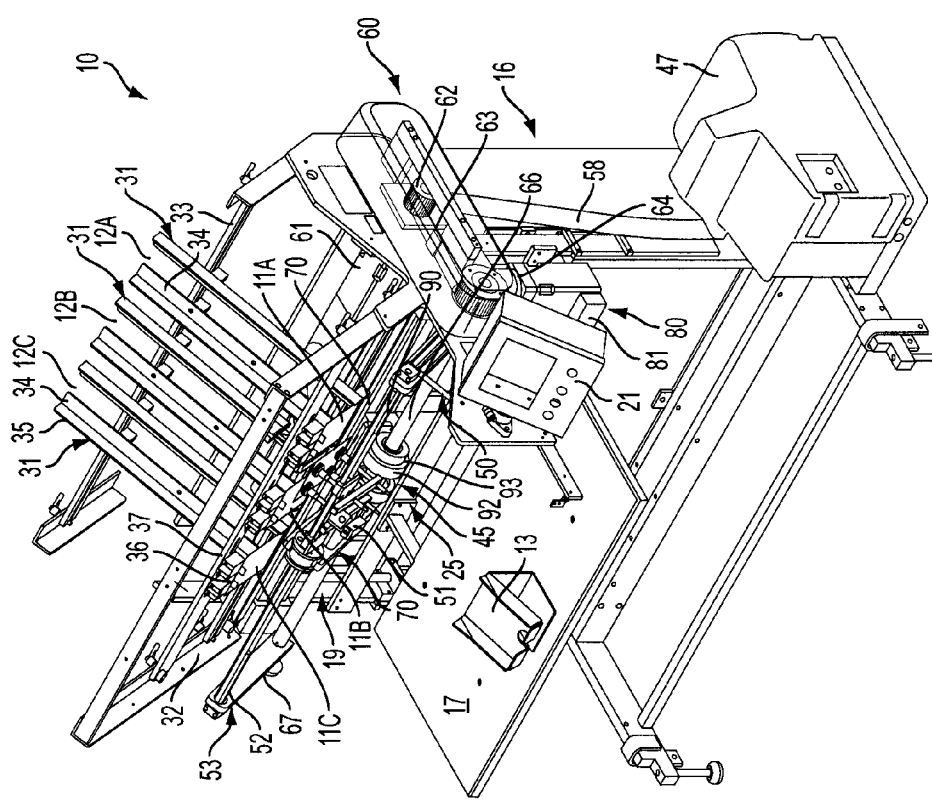
Figure 2A:
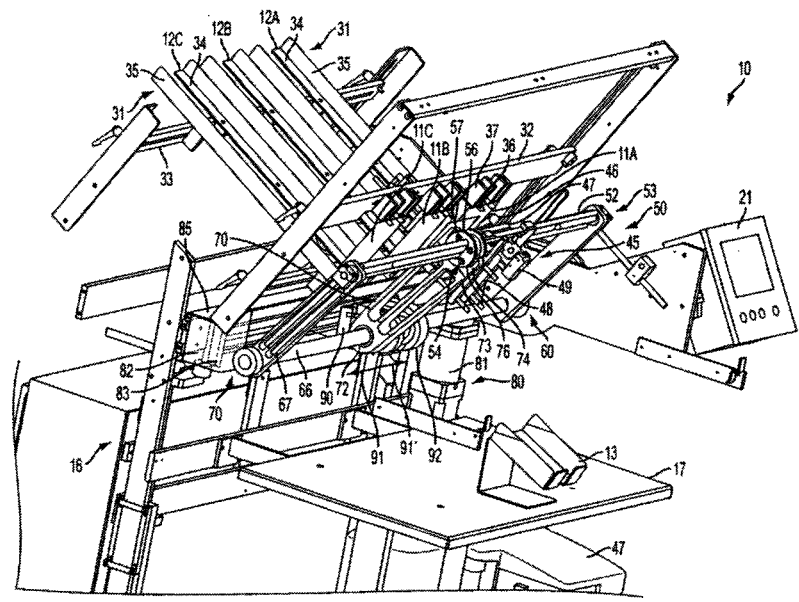
FIG. 2A is a perspective view of the multi-lane reciprocating placer system of FIGS. 1A-1B, shown from the left side thereof, with parts broken away.
Figure 2B:
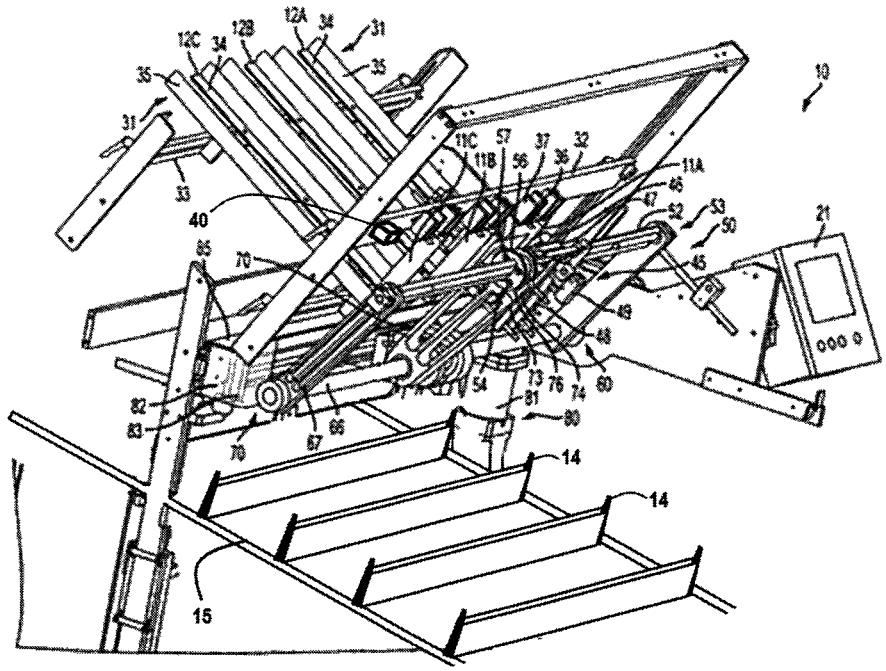
FIG. 2B is a perspective view of the multi-lane reciprocating placer system according to a further embodiment including a product conveyor with a series of flights, shown from the left side thereof, with parts broken away.

Referring now to the drawings in which like numerals indicate like parts throughout the several views, FIGS. 1A-8B illustrate various views of one example embodiment of a multi-lane reciprocating placer system 10 for selectively feeding articles 11A-11C from one or more magazines 12A-12C and for depositing the selected articles 11A-11C at a desired location, such as placing each article into a receptacle 13 or, as shown in FIG. 2B, within a series of flights 14 of a carton or product conveyor 15 passing through beneath. The articles 11A-11C are generally illustrated in the figures as being flat cards or similar stock material articles arranged in stacks each loaded onto a separate magazine 12A-12C. It will, however, be understood by those skilled in the art that various types of articles, including articles having substantially two-dimensional and three-dimensional configurations, i.e., articles having a length, width and depth such as trays, boxes or other, similar stacked materials, also can be picked and placed using the multi-lane reciprocating placer system 10 according to the principles of the present invention.

Still further, it also will be understood by those skilled in the art that while three magazines 12A-12C generally are shown in the present multi-lane reciprocating placer system 10, greater or fewer magazines also can be provided in spaced series across the multi-lane reciprocating placer system as needed or desired. The number of magazines provided can be varied based upon the size of the articles being stacked therein and/or on the size of the frame 16 of the multi-lane reciprocating placer system 10 utilized for a particular picking and placing/feeding application. In addition, as previously noted, while a single receptacle 13 is illustrated for purposes of receiving the articles 11A-11C selectively picked and removed from one or more of the magazines 12A-12C, it will be understood by those skilled in the art that multiple receptacles or boxes 13 also can be used. It also will be understood that one or more conveyor or other product and/or receiving mechanisms also can be used. The multi-lane reciprocating placer system further is operable to selectively pick the articles from one or more of the magazines 12A-12C, including for collating the placement and/or stacking of different articles 11A-11C from the different magazines 12A-12C in a desired or programmed sequence, and thereafter place the articles within the flights of a carton or product conveyor moving below the multi-lane reciprocating placer system 10.

As illustrated in FIGS. 1A-1B, the multi-lane reciprocating placer system 10 generally includes a frame 16, which can include one or more supports, and further can include cabinets, shelves or trays, such as shelf 17 on which the receptacle 13 is supported. The frame 16 also can have a substantially open configuration for mounting above a carton or product conveyor to enable passage of the flights of the product or carton conveyor therebeneath. As further illustrated in FIG. 1A, the frame also can include a series of guards or covers 18 that can be pivoted between an open position and an enclosed or covering position shown in FIG. 1A, so as to enclose an article picking area 19 defined in front of the magazines 12A-12C.

An operator control system 21 also can be provided adjacent or along one side of the frame 16, and can include a touch screen or other, similar controller as will be understood by those skilled in the art. The control system enables an operator to control the speed of operation of the multi-lane reciprocating placer system and various operative components thereof, as well as for selectively controlling the operation and both lateral/transverse and pivoting or rotational movement of a picking assembly 25 along/about the picking area 19 for selectively picking articles 11A-11C from the different magazines 12A-12C and thereafter placing such articles within one or more receptacles, or within the flights of a carton or product conveyor passing therebeneath, with the movements of the picking assembly being controlled so as to substantially match the movement of the conveyor flights passing therebelow.

For example, the picking assembly 25 can be controlled to selectively pick one article 11A-11C from each of the magazines 12A-12C in a predefined sequence, such as picking an article from magazine 12A, then magazine 12B, then magazine 12C, or picking multiple articles from one or more of the magazines, such as picking a first article from magazine 12A, loading it in the receptacle, and picking a second article from magazine 12A and loading it into the receptacle, before picking an additional article from either magazine 12B or 12C. Other operational sequences also can be performed. Thus, the picking assembly 25 can be controlled as needed for performing a variety of feeding operations including collating stacks of articles from each of the different magazines to form discrete stacks of different articles from each of the different magazines. Alternatively, the multiple magazines can be supplied with the same articles and the picking assembly 25 controlled to pick the articles from one magazine at a time, thus using the additional magazines as further article storage areas so that the multi-lane reciprocating placer system can be provided with an expanded supply of articles for picking and placing in the receptacle or conveyor flights, with its storage capacity being up to two to four times or more the storage capacity of placer systems having only one magazine.

As illustrated in FIGS. 1A-4B and 6A-7, each of the magazines 12A-12C generally can include a series or pair of rails or guides 31 moveably mounted on adjustable front and rear supports 32 and 33 of the frame 16. Each of the rails 31 is generally shown in one example embodiment in the figures as including substantially L- or C-shaped configurations each having an upper surface 34 on which the articles 11A-11C can be stacked and will progressively slide, and further can include upwardly extending side guide portions 35. Each of the support rails 31 generally will be moveable laterally toward and away from each other along their front and rear supports 32/33, and the front and rear supports 32/33 themselves further can be adjusted vertically to enable raising and lowering of the magazines, as well as tilting or reorienting of the magazines at a desired angle. Still further, the rails 31 defining the magazines 12A-12C also can be removed and/or additional sets of rails mounted on the frame supports 32/33 as needed to expand or provide additional or fewer magazines for the multi-lane reciprocating placer system 10 as needed or desired depending upon the size and/or type of articles being picked and placed.

Figure 3:
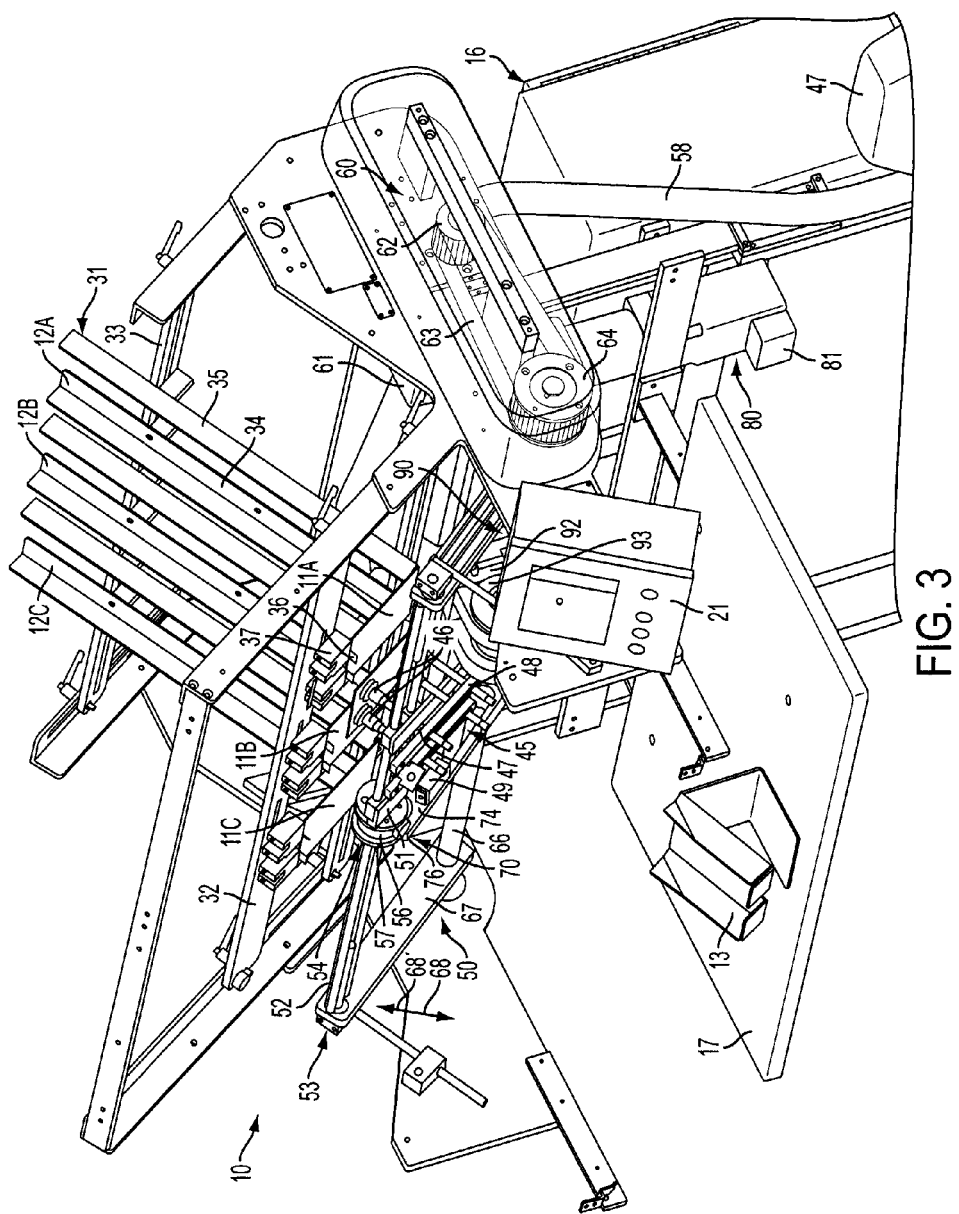
FIG. 3 is a perspective view of the multi-lane reciprocating placer system of FIG. 1A-1B, shown from the right side thereof, with parts broken away.
Figure 4A:
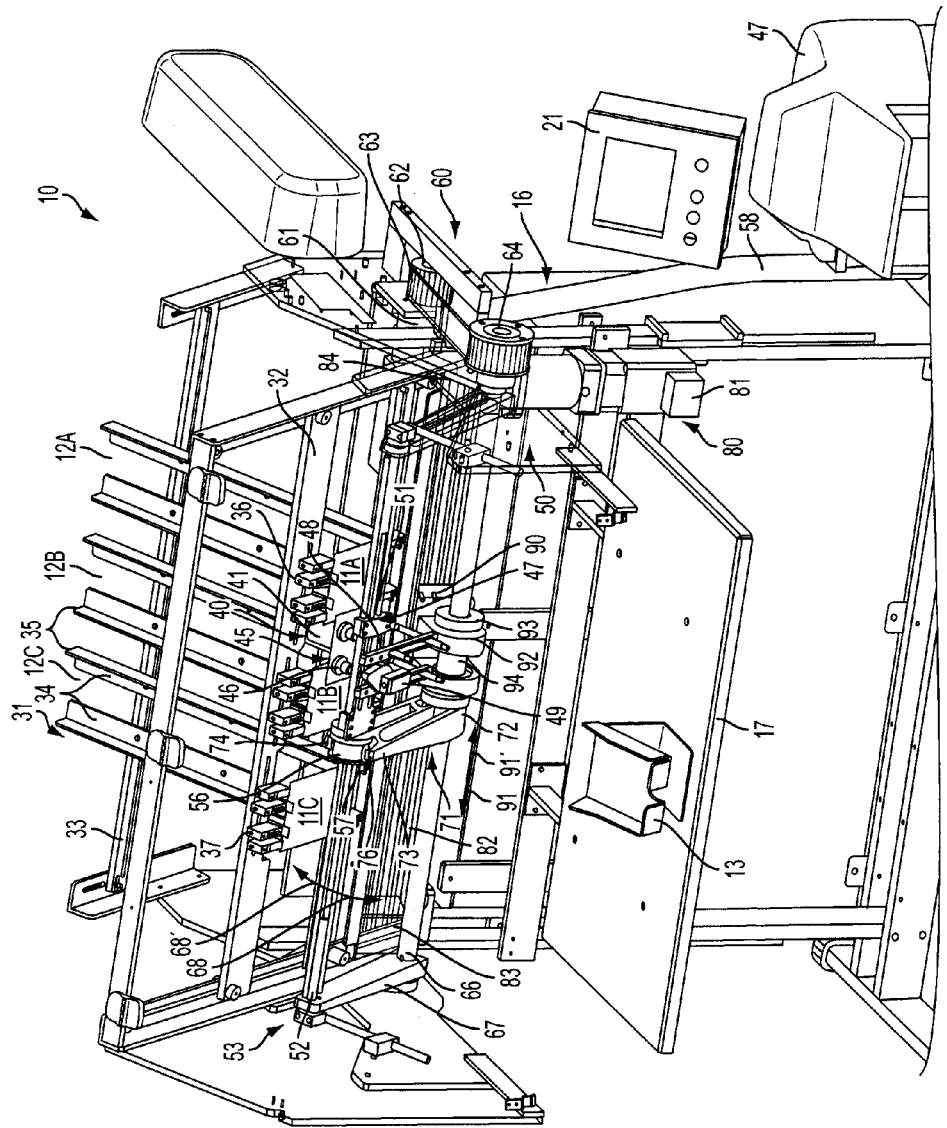
FIGS. 4A-4B are schematic views of the multi-lane reciprocating placer system of FIGS. 1A-1B, illustrating the picking assembly and pivoting drive system therefor.
Figure 4B:
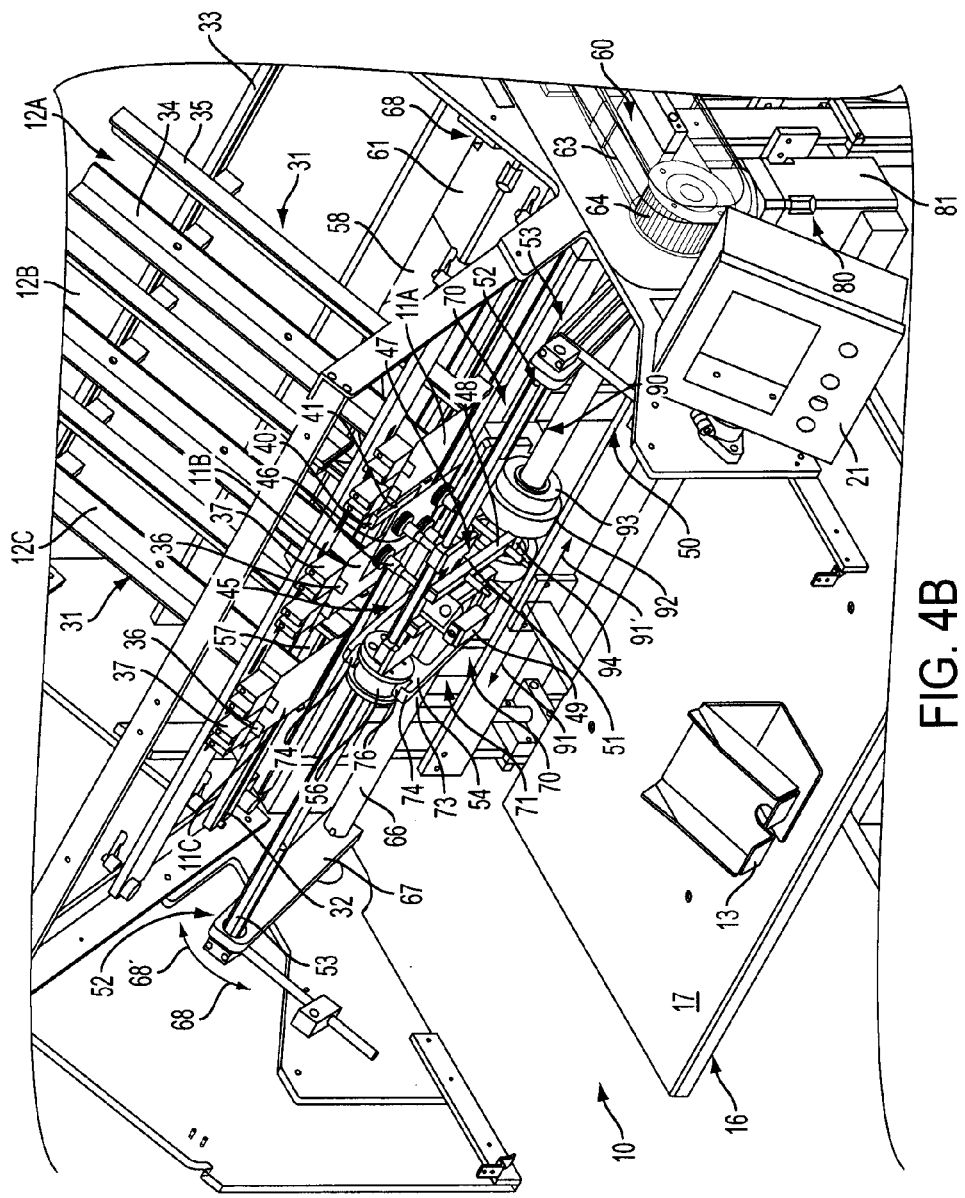
Figure 5:
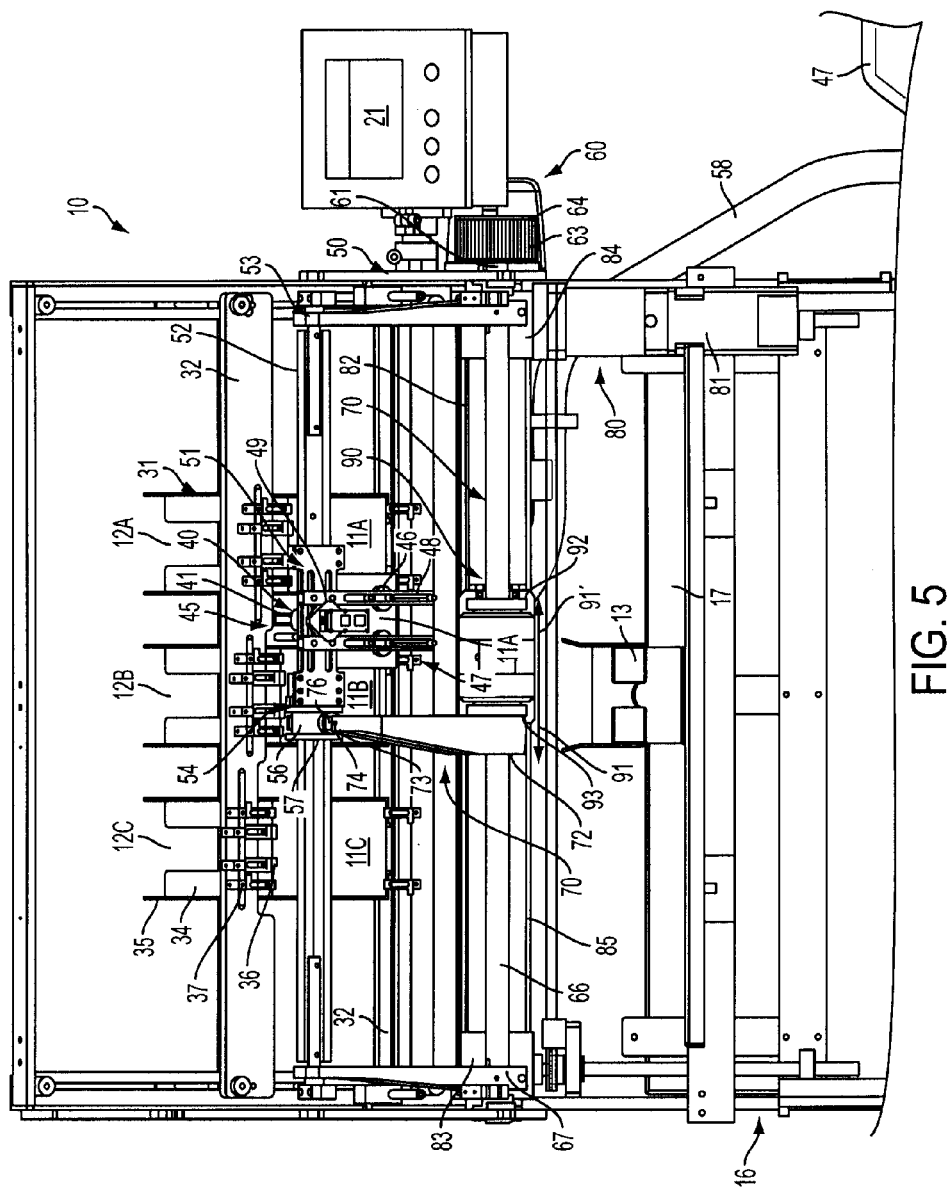
FIG. 5 is a front side elevational view of the multi-lane reciprocating placer system illustrating the multiple magazines and movement of the vacuum cup carriage of the picking assembly.
Figure 6A:
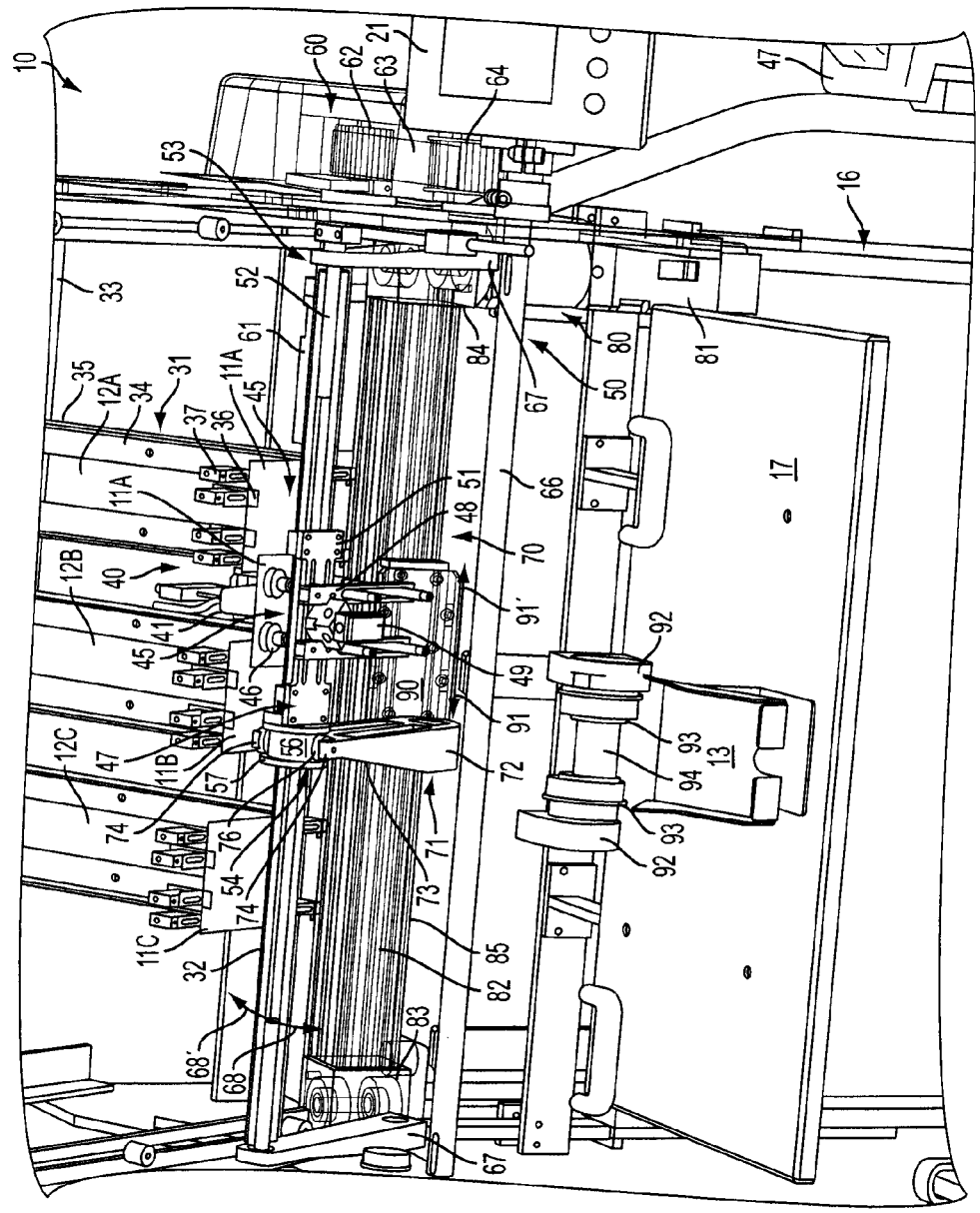
FIGS. 6A-6B are perspective views, with parts broken away and exploded, of the multi-lane reciprocating placer system of FIGS. 1A-1B, further illustrating the vacuum cup carriage and lateral drive system therefor of the picking assembly.
Figure 6B:
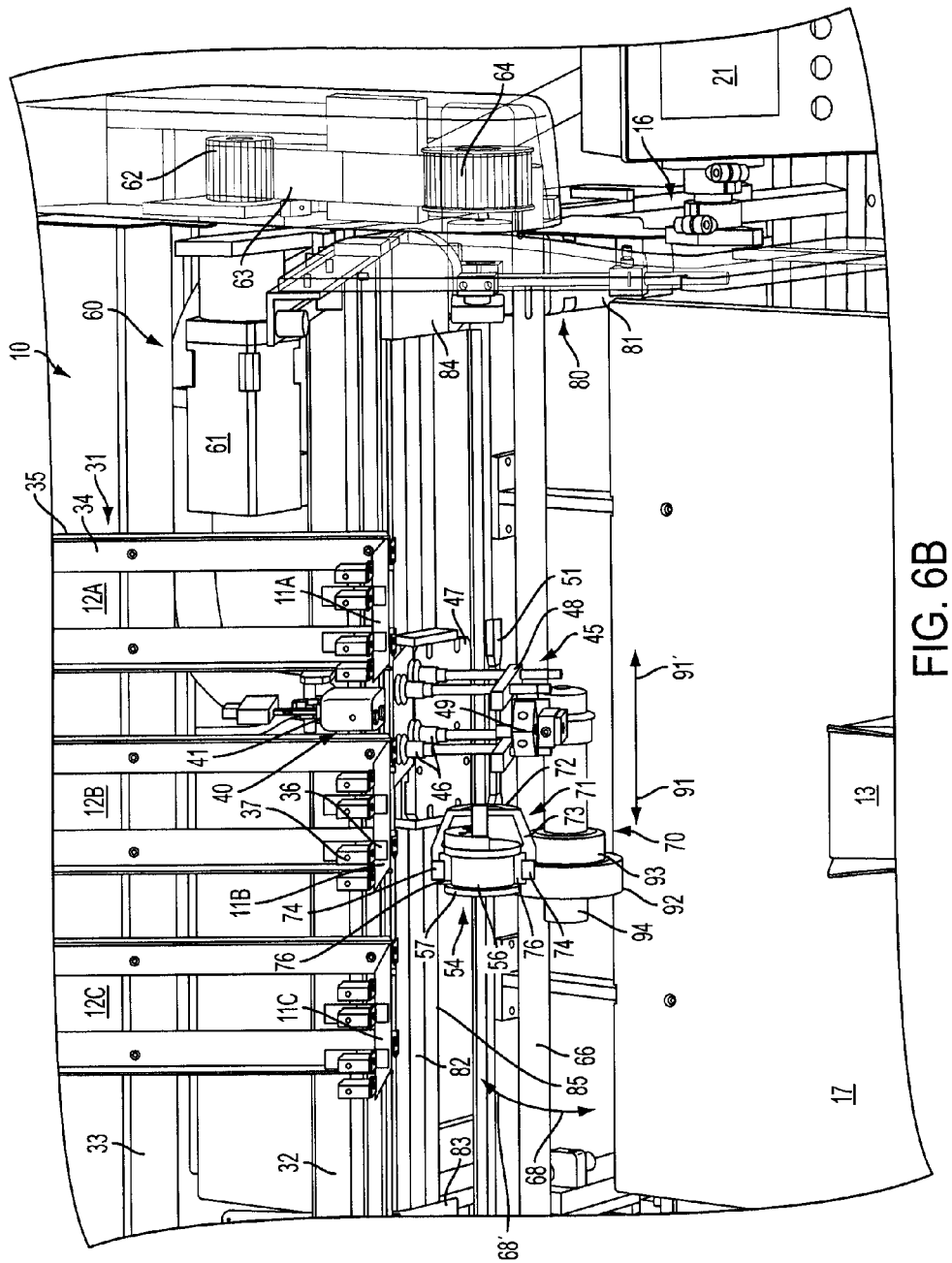

As additionally shown in FIGS. 3-6B, a series of adjustable clips 36 also can be mounted along the upper and lower front supports 32 adjacent the front or proximal ends of the magazines. Each of the clips 36 generally can include plastic, metal or other, similar material strips adjustably received in holders 37 and will engage and bear against the upper and front surfaces of the foremost articles in each stack of articles contained within each magazine, as generally illustrated in FIGS. 3 and 6A-6B. The clips thus will provide frictional engagement for holding the articles in place in a stacked configuration within the magazines until they are picked or removed therefrom by the picking assembly 25.

Figure 7:
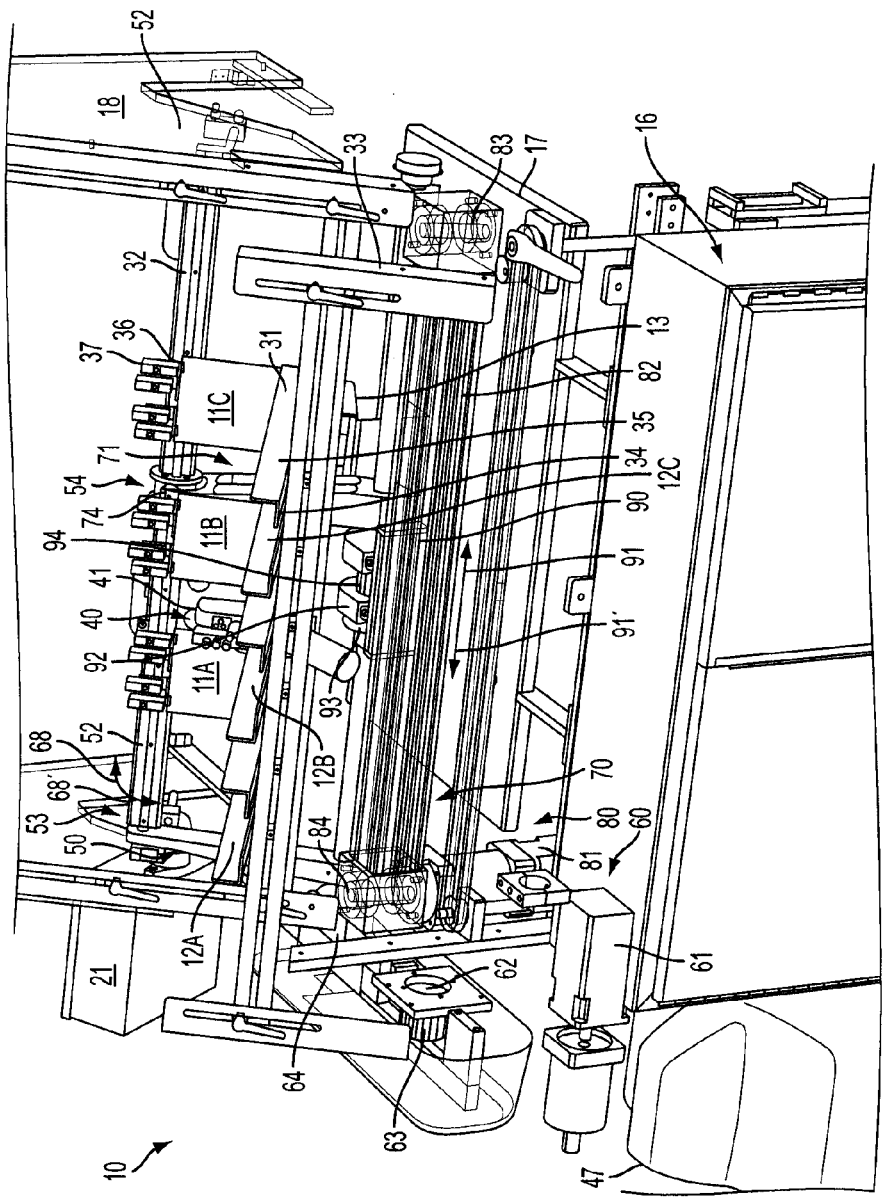
FIG. 7 is a schematic view of the rear of the multi-lane reciprocating placer system, illustrating the lateral drive system and linear belt thereof for driving the vacuum cup carriage.

As further generally illustrated in FIGS. 4A, 4B and 6A-7, one or more applicators or other, similar operative devices or systems 40 can be mounted along the frame supports 33 adjacent or between one or more of the magazines 12A-12C. For example, an adhesive applicator 41, such as illustrated in FIGS. 6A-7, can be mounted adjacent one or more of the magazines, in a position so as to apply an adhesive material to a rear surface of an article (e.g., article 11A as shown in FIGS. 6A-7) after the article has been picked or removed from its magazine. As the picking assembly 25 moves the article adjacent the adhesive applicator 41, the adhesive applicator can apply an adhesive, such as in a spray or bead form, against the rear surface of the article for attachment of the article to a previously stacked article or other product or component. While one adhesive applicator 41 is shown mounted between the magazines 12A and 12B, it will be understood by those skilled in the art that additional adhesive applicators also can be used, and can be positioned at different locations across the width of the frame, with the articles being selectively presented to the adhesive applicator(s) as needed for application of a glue or adhesive material thereto.

In addition, other operative devices or systems 40 such as one or more sensors or scanner, including a bar code or other, similar scanner, can be positioned along the forward frame supports 32 in place of or in addition to the adhesive applicator(s) 41. For example, a sensor or scanner can be placed adjacent each of the magazines in a position so as to read a bar code or similar indicia applied to a surface of the articles to provide feedback and inventory control and tracking of the articles as they are picked and placed by the multi-lane reciprocating placer system 10. In still another possible embodiment, one or more print heads such as ink jet or laser jet type printer heads can also be used, either in conjunction with one or more scanners and/or one or more adhesive applicators, for applying printing to the articles as they are picked from their magazines prior to placement thereof within a receptacle or onto a conveyor. Such operative devices or applicators 40 can be controlled by the control system 21. It further will be understood by those skilled in the art that various other operative elements or applicators also can be utilized within the multi-lane reciprocating placer system 10 according to the principles of the present invention.

As illustrated in FIGS. 2A and 4A-6B, the picking assembly 25 generally will include a vacuum cup assembly 45 including one or more vacuum cups 46 each connected to a vacuum supply 47, and mounted along an adjustable frame 48 so as to enable adjustment of the horizontal and vertical positions of the vacuum cups with respect to the articles 11A-11C being picked. Other picking mechanisms such as grippers, clamps and/or other devices also can be used for picking the articles. The vacuum cup assembly 45 generally is coupled to a pivot mechanism 50 that controls the pivoting movement of the vacuum cup assembly 45 toward and away from the magazines for picking and removal and placement of the articles from the magazines and into the receptacle or onto a conveyor therebelow. A plenum 49 or other vacuum control further will be mounted along the adjustable frame 48 of the vacuum cup assembly 45 for routing and controlling the application of the vacuum or suction pressure through the vacuum cups to the articles for picking of the articles from the magazines and thereafter holding the articles against the vacuum cups during transport to the receptacle or to a flight of the carton or product conveyor.

As illustrated in FIG. 5, the frame 48 of the vacuum cup assembly 45 will be mounted on a transversely or laterally moveable bracket or carrier 51 that is slidably mounted on guide rails 52 so as to be moveable laterally or transversely with respect to the magazines. The guide rails 52 are part of a pivoting frame 53 of the pivot assembly 50 and support the vacuum cup assembly during the pivoting movement thereof. As FIGS. 2A, 4A-4B and 6A illustrate, an enlarged bearing 54 is mounted to one end of the slide bracket 51. The bearing is further shown as having a central bearing portion 56 of a reduced diameter, with end plates 57 of a larger diameter bordering each side thereof.

Figure 8A:
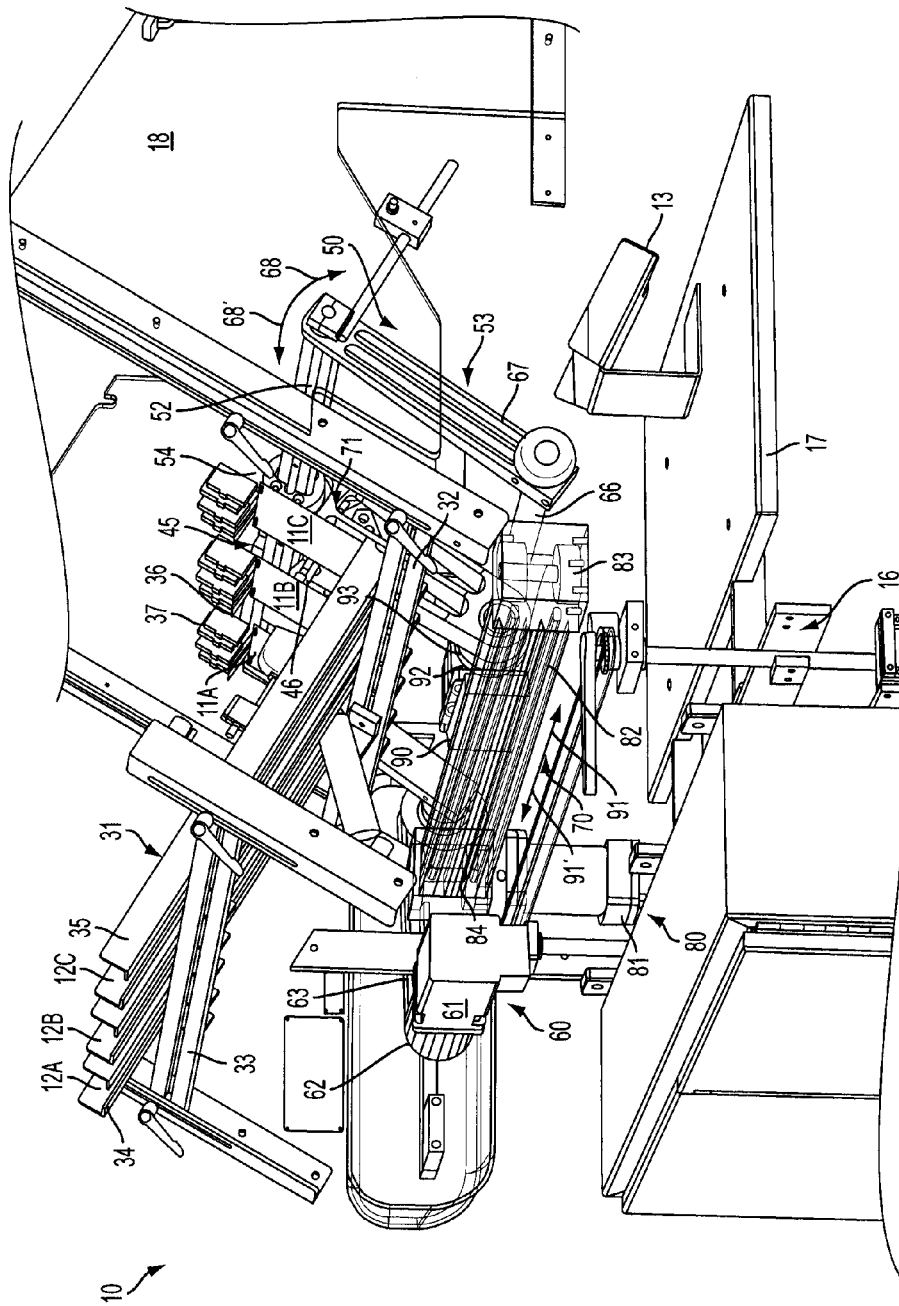
FIGS. 8A-8B are perspective views of the multi-lane reciprocating placer system, taken from the left side thereof with parts broken away, illustrating the drive systems and pivoting frame for the picking assembly.

As additionally shown in FIGS. 1A-1B, 3 and 4, the vacuum supply 47 generally can be provided adjacent the frame 16 of the multi-lane reciprocating placer system 10 for applying a vacuum or suction to the vacuum head via a hose or supply line 58. As further generally illustrated in FIGS. 1B, 3 and 4A, the pivot assembly 50 includes a drive system 60 for controlling the pivoting motion of the frame 53 of the pivot assembly 50 and vacuum cup assembly 45. In one embodiment, illustrated in the figures, the drive system 60 of the pivot assembly 50 generally will include a variable speed, reversible motor 61 that typically is linked to a drive sprocket 62, as illustrated in FIGS. 6B and 8A. It further will be understood that various mechanisms or systems such as air cylinders, other types of motors and/or other drives also can be used in place of motor 61. The drive sprocket 62 is connected via a drive belt 63 to an idler sprocket 64 which is coupled to one end of a pivot shaft or rod 66 as illustrated in FIGS. 4A, 5 and 6B. The ends of the pivot shaft 66 further are attached to side supports 67 of the pivoting frame 53, as shown in FIGS. 2, 4A and 5 so as to cause the pivoting movement of the frame 53 as the pivot shaft 66 is rotated. The motor 61 is controlled by the control system 21 so as to drive the belt 63 in forward/rearward directions indicated by arrows 68/68', in response to which the pivot shaft 66 is rotated in a reversible manner to provide the pivoting motion of the vacuum cup assembly 45 toward and away from the magazines 12A-12C and the articles stacked therein.

As also illustrated in FIGS. 4A-8B, in addition to its pivoting motion, the vacuum cup assembly 45 further generally is moveable laterally across the multi-lane reciprocating placer system 10 so as to be moveable back and forth, in a transverse direction with respect to the magazines 12A-12C so as to enable the selective movement of the vacuum cup assembly between each of the different magazines as needed for the selected picking and removal of articles therefrom. The lateral or transverse movement of the vacuum cup assembly further enables the placement of the articles, once picked from their magazines, in a desired location or within a flight of the carton or product conveyor passing therebeneath, with the movement of the vacuum cup assembly in both a lateral or transverse direction and in a pivoting motion being controlled to substantially match the speed of the flights of such a carton or product conveyor as needed for placement of the articles therein.

As indicated in FIGS. 2A, 5 and 6A-6B, the lateral movement of the vacuum cup assembly 45 is controlled by a lateral drive system 70, which includes a forked support arm 71 that generally will engage the bearing 54 so as to couple the lateral drive system 70 to the vacuum cup assembly 45. The support arm 71 generally will have a first or proximal end 72 that fits over the pivot rod or shaft 66 of the pivot assembly 50 with a clearance thereabout so as to be movable along the pivot rod, and a second or distal end 73 having a pair of spaced fingers or gripping portions 74 that are received about and engage the central bearing portion 56 of the bearing 54. Each of the fingers 74 can further include a bearing plate or cushion 76, generally formed from a soft, reduced friction material. As a result, as the vacuum cup assembly is pivoted toward and away from the magazines, the bearing 54 of the vacuum cup assembly can rotate between the fingers 74 of the support arm, enabling the support arm to pivot with the pivoting movement of the vacuum cup assembly without disrupting the contact or coupling engagement between the support arm and the bearing.

Figure 8B:
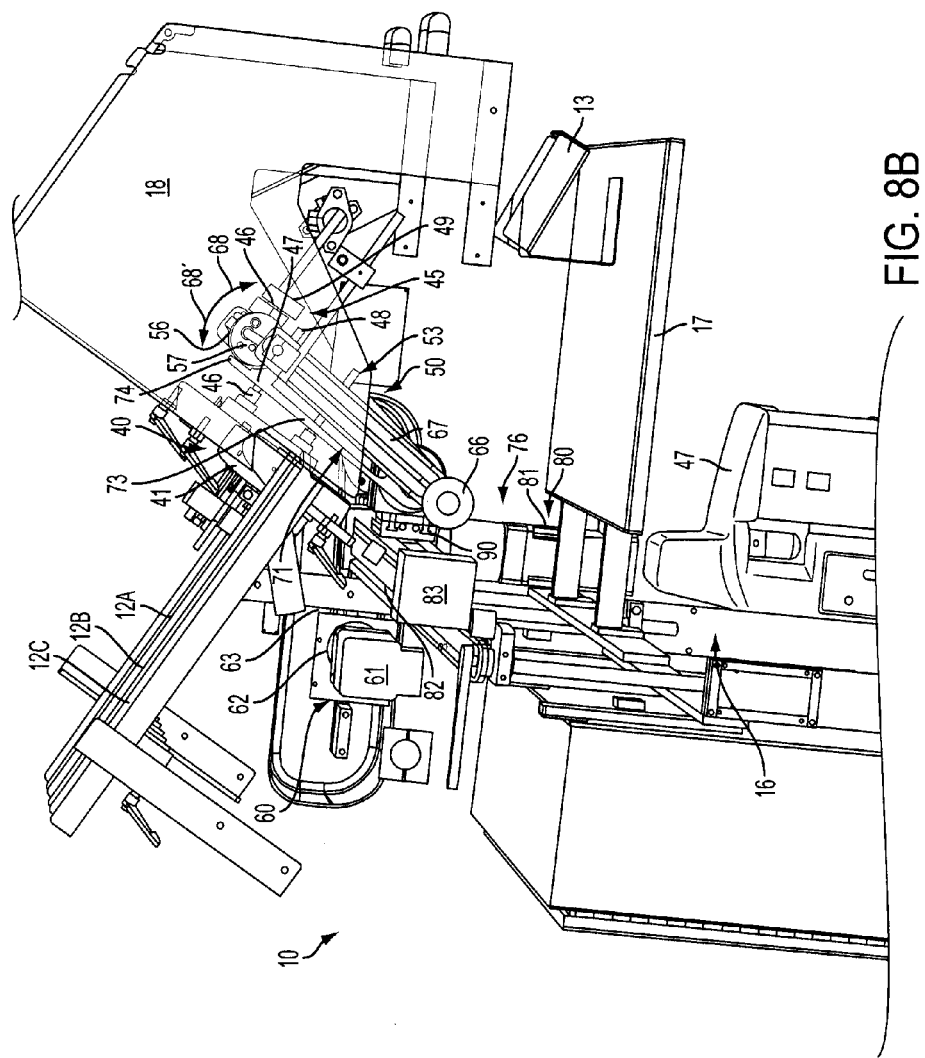

As generally illustrated in FIGS. 4A-8B, the lateral drive system 70 further generally includes a variable speed, reversible drive motor 81 (FIGS. 5 and 8A), which is connected to and drives a horizontally extending linear drive belt 82. Other mechanisms such as air cylinders, other types of motors and/or other drive systems also can be used in place of motor 81. As indicated in FIG. 7, the linear drive belt 82 generally is mounted in a vertically oriented, upstanding arrangement, extending about pairs of sprockets or drive rollers 83 and 84 mounted on opposite sides of the frame 16 of the multi-lane reciprocating placer system. The linear drive belt further can be contained within a housing or cover 86, such as shown in FIGS. 5 and 8B, which can include slots or openings along the front surface thereof. The control system 21 can control the motor 81 so as to move the linear drive belt in a reversing, back and forth motion.

A carriage 90 is mounted to the drive belt, as indicated in FIGS. 6A-7 so as to be moveable laterally in a transverse direction back and forth across the multi-lane reciprocating placer system 10, in the direction of arrows 91 and 91' with the movement of the linear drive belt. The carriage 90 is coupled to the vacuum cup assembly by the pivoting support arm 71 for moving the vacuum cup assembly 45 in the direction of arrows 91 and 91' as indicated in FIGS. 4A and 5-6B. As shown in FIGS. 4A and 5, a pair of spaced brackets 92 are attached to a front face carriage 90 and include bearings 93 that are received over the pivot shaft or rod 66, with a guide shaft or sleeve 94 being received between the bearings and brackets. The bearings maintain the brackets at a clearance over and out of contact with the pivot rod 66, centering the pivot axis of the pivoting frame 53 of the pivot assembly 50 and the vacuum cup assembly 45 about the pivot shaft 66.

As illustrated in FIGS. 5 and 6B, the pivoting support arm 71 engages one of the bearings 93 so as to be moveable along the pivot shaft 66 with the lateral movement of the carriage 90, while remaining pivotable with respect to the pivot shaft with the pivoting motion of the vacuum cup assembly. As a result, as the pivot shaft 66 is rotated by operation of the drive mechanism 60, the pivoting frame 53 moves the vacuum cup assembly toward and away from the magazines, while the pivoting support arm is maintained in contact with the bearing 54 of the slide bracket 51 of the vacuum cup assembly, so as to maintain a connection between the vacuum cup assembly and the lateral drive system 70. This also enables further lateral or transverse movement of the vacuum cup assembly by operation of the lateral drive system 70 even as the vacuum cup assembly is being pivoted toward and away from the magazine.

As a result, the multi-lane reciprocating placer system of the present invention can be utilized for selectively feeding a variety of different size and configuration articles from multiple magazines arranged in spaced series across the frame of the multi-lane reciprocating placer system. The vacuum cup assembly can be moved to various locations across the multi-lane reciprocating placer system and controlled so as to selectively pick and thereafter place articles from different ones of the magazines, including picking articles from one magazine only, and/or selectively picking articles from each of the magazines in a desired sequence. The movement of the vacuum cup assembly in both transverse and vertical pivoting directions further can be adapted or controlled so as to match the feed speed of the flights of a carton or product conveyor passing therebeneath for depositing of the articles in timed relation with the movement of the conveyor. As a result, the multi-lane reciprocating placer system can be provided with additional capacity in terms of additional magazines, and can be utilized for collating and/or selective stacking or feeding of various configuration articles to desired/programmed locations including depositing the articles in one or more discrete stacks or receptacles or in the flights of a carton or product conveyor.

The foregoing description generally illustrates and describes various embodiments of the present invention. The examples given above are merely illustrative and are not meant to be an exhaustive list of all possible designs, aspects, applications or modifications of the present disclosure. It will, therefore, be understood by those skilled in the art that while the present disclosure has been described in terms of exemplary aspects, the present disclosure can be practiced with various changes and modifications which can be made to the above-discussed construction of the present invention without departing from the spirit and scope of the invention as disclosed herein, and that it is intended that all matter contained in the above description or shown in the accompanying drawings shall not to be taken in a limiting sense.

Furthermore, the scope of the present disclosure shall be construed to cover various modifications, combinations, additions, alterations, etc., to the above-described embodiments, which shall be considered to be within the scope of the present invention. Accordingly, various features and characteristics of the present invention as discussed herein may be selectively interchanged and applied to other illustrated and non-illustrated embodiments of the invention, and numerous variations, modifications, and additions further can be made thereto without departing from the spirit and scope of the present invention as set forth in the appended claims.

The invention claimed is:

1. A reciprocating placer system for feeding articles comprising:
   a frame;
   a plurality of magazines mounted along the frame, each adapted to receive a stack of articles therein, wherein the articles comprise varying types, configurations or sizes;
   a picking assembly adjacent the plurality of magazines and movable along a path of travel laterally across the frame into positions aligned with each of the stacks of articles received in each of the plurality of magazines for engaging selected articles of the stacks of articles received within the plurality of magazines, the picking assembly further being pivotable toward and away from the magazines for picking and removing the selected articles from the plurality of magazines and placing each of the selected articles in a receptacle or conveyor flight;
   a drive system for adjusting the lateral movement of the picking assembly; and
   a control system controlling lateral movement of the picking assembly by the drive system for selectively positioning in alignment with each magazine of the plurality of magazines, and for controlling pivoting movement of the picking assembly toward and away from the stacks of articles received within the plurality of magazines for engaging and picking each selected article from its stack of articles received within each of the plurality of magazines and placing of each selected article into the receptacle or conveyor flight,
   wherein the control system moves the picking assembly into different positions aligned with each of the plurality of magazines to pick a series of articles of particular types, configurations, or sizes from the magazines in sequence for placement of the articles within the receptacle or conveyor flight.

2. The reciprocating placer system of claim 1, wherein the picking assembly comprises a vacuum cup assembly having a series of vacuum cups mounted on a carriage, the carriage being linked to the lateral drive system for moving the carriage along a laterally extending path of travel with respect to the magazines.

3. The reciprocating placer system of claim 2, wherein the lateral drive system comprises a reversible drive motor that drives a laterally movable carriage in transverse directions with respect to the magazines, and a pivoting support arm extending between the laterally movable carriage and the carriage of the vacuum cup assembly, wherein as the laterally movable carriage is moved, the vacuum cup assembly is caused to move laterally between its positions for picking selected articles from the stacks of articles received within the magazines, while further being permitted to pivot longitudinally toward and away from the magazines.

4. The reciprocating placer system of claim 1, further comprising an adhesive applicator mounted adjacent the path of travel of the picking assembly in a position for applying an adhesive material to selected articles removed from the plurality of magazines.

5. The reciprocating placer system of claim 1, further comprising a printer adjacent the path of travel of the picking assembly for applying printing to the articles.

6. The reciprocating placer system of claim 1, further comprising a scanner adjacent the path of travel of the picking assembly for scanning an indicia applied to the articles removed from the magazines.

7. The reciprocating placer system of claim 1, wherein the control system controls the lateral and pivoting movement of the picking assembly to selectively pick the selected articles from the stacks of articles received within each of the plurality of magazines according to a predefined sequence.

8. The reciprocating placer system of claim 1, wherein each of the plurality of magazines comprise at least one clip mounted to a proximal end of each magazine of the plurality of magazines for engaging and bearing against a front surface of a foremost article in the stacks of articles received within the plurality of magazines.

9. The reciprocating placer system of claim 1, further comprising one or more feedback devices communicating with the control system and positioned along the frame for tracking of articles as they are picked and removed from the magazines and placed in the receptacle or conveyor flight.

10. A reciprocating placer system comprising:
a frame;
a series of magazines mounted along the frame and each adapted to receive a stack of articles therein;
a picking assembly located adjacent the series of magazines and movable along a path of travel laterally across the frame into a position aligned with the stack of articles received within at least one magazine of the series of magazines, the picking assembly further being movable toward and away from the at least one magazine for picking and removing selected articles from the stack of articles received within the at least one magazine, and comprising a vacuum cup assembly having a series of vacuum cups mounted on a carriage;
a lateral drive system for moving the carriage along a laterally extending path of travel with respect to the at least one magazine so as to move the picking assembly into its position aligned with the stack of articles;
a pivot assembly including a pivoting frame having a series of laterally extending guide rails along which the carriage of the vacuum cup assembly is supported and is movable laterally along its extending path of travel, and a pivoting drive system for controlling pivoting movement of the pivot assembly and the vacuum cup assembly toward and away from the at least one magazine for picking and removing the selected articles therefrom; and
a control system for controlling lateral movement of the picking assembly by the lateral drive system, and for controlling pivoting movement of the picking assembly by the pivoting drive system toward and away from the at least one magazine for selectively engaging and picking articles from the at least one magazine.

11. A reciprocating placer system for selectively feeding articles comprising:
a frame;
a series of magazines, each including a series of guides adjustably mounted in spaced series across the frame, wherein each of the magazines can be adjusted to receive articles of varying types, configurations and/or sizes;
a picking assembly movable laterally across the frame along a path of travel adjacent the magazines into positions aligned with stacks of articles received within each of the magazines for engaging selected articles from the stacks of articles received within the magazines, the picking assembly further being movable toward and away from the magazines for picking and removing the selected articles from the stacks of articles received within the magazines;
a drive system for adjusting the lateral movement of the picking assembly; and
a control system for controlling lateral movement of the picking assembly by the lateral drive system, and for controlling movement of the picking assembly toward and away from the magazines for selectively engaging, picking and placing a series of varying type, configuration and/or size articles from the magazines in accordance with a predefined sequence.

12. The reciprocating placer system of claim 11, further comprising adjustable front and rear supports on which the guides of the magazines are mounted, wherein the front and rear supports are adjustable vertically with respect to the frame and wherein the guides are adjustable laterally along the front and rear supports to receive articles of a predetermined type, configuration and/or size.

13. A method of selectively picking and placing a series of articles from multiple magazines, comprising:
selectively moving a picking assembly along a path of travel between a series of picking positions each aligned with one of the magazines, the magazines being configured to receive articles of varying types, configurations or sizes;
engaging and picking at least one article of a selected type, configuration or size from a magazine with the picking assembly;
pivoting the picking assembly and the at least one article of the selected type, configuration or size engaged thereby away from the magazine;
moving the picking assembly with the at least one article of the selected type, configuration or size engaged thereby to a location aligned with a receptacle or conveyor flight;
placing the at least one article of the selected type, configuration or size within the selected receptacle or conveyor flight; and
moving the picking assembly away from the receptacle or conveyor flight and into one of the positions aligned with one of the magazines to pick and engage another article of a selected type, configuration or size from the magazine.

14. The method of claim 13, further comprising selectively picking a series of articles from the multiple magazines and placing the articles in a stack in a collated arrangement.

15. The method of claim 13, wherein selectively moving the picking assembly comprises moving a carriage along a lateral path of movement between a series of locations each aligned with one of the magazines of the multiple magazines.

16. The method of claim 13, wherein engaging and picking the articles comprises pivoting a vacuum cup assembly toward engagement with the articles, applying a vacuum to the articles, and pivoting the vacuum assembly and the articles away from the magazines to remove the articles from the magazines.

17. The method of claim 13, further comprising arranging a predetermined number of magazines along a frame, adjusting the predetermined number of magazines to receive articles of a predetermined size and/or configuration therein, and loading at least one magazine of the predetermined number of magazines with a stack of articles.

18. The method of claim 17, wherein three magazines are provided, and wherein the picking assembly engages and picks articles from one or more of the three magazines in accordance with a predefined sequence.

19. The method of claim 18, wherein the predefined sequence comprises engaging and picking the articles from a single one of the three magazines until all articles received therein have been removed.

20. The method of claim 13, wherein the picking assembly is movable laterally along its path of travel between the multiple magazines, and is pivotable toward and away from the multiple magazines for placing the articles.

21. The method of claim 13, wherein placing the article comprises depositing the article in a receptacle or conveyor flight.

22. A method of picking and placing articles, comprising:
a. moving a picking assembly laterally to a position aligned with a series of articles received within a magazine of a series of magazines;
b. engaging and picking an article from the articles received within the magazine;
c. pivoting the picking assembly away from the magazine to remove the article from the magazine;
d. moving the article with the picking assembly so as to substantially match a speed of a flight of a product conveyor; and
e. selectively placing the article within the flight of the product conveyor; and
f. repeating steps a-e to selectively pick and place a plurality of articles selectively within flights of the product conveyor according to a predefined sequence.

23. The method of claim 22, wherein moving the picking assembly laterally comprises moving the picking assembly along a path of travel between locations aligned with a series of magazines for removing selectively articles from the series of magazines.

24. The method of claim 23, wherein three magazines are provided, and wherein the picking assembly engages and picks the articles from the three magazines in accordance with the predefined sequence.

25. The method of claim 24, wherein the predefined sequence comprises engaging and picking the articles from a single one of the magazines until all of the articles therein have been removed.

26. The method of claim 22, further comprising arranging a predetermined number of magazines along a frame, adjusting the magazines to receive articles of a predetermined size and/or configuration therein, and loading at least one magazine with a stack of articles.

27. A method of picking articles from multiple magazines, comprising:
selectively moving a picking assembly along a path of travel to a series of picking positions aligned with each of the magazines;
engaging and picking selected articles from the magazines with the picking assembly;
pivoting the picking assembly and the selected articles engaged thereby away from the magazines;
moving the picking assembly with the selected articles engaged thereby to a location aligned with a receptacle or conveyor flight and placing the selected articles within the receptacle or conveyor flight; and
picking and placing additional articles within the receptacle or conveyor flight for collating a series of different articles selectively picked from each of the magazines within the receptacle or conveyor flight.

* * * * *